US012632796B2

(12) United States Patent
Gupta et al.

(10) Patent No.: US 12,632,796 B2
(45) Date of Patent: May 19, 2026

(54) TRAINING MACHINE LEARNING MODELS TO PREDICT CHARACTERISTICS OF ADVERSE EVENTS USING INTERMITTENT DATA

(71) Applicant: X Development LLC, Mountain View, CA (US)

(72) Inventors: Akshina Gupta, Warren, NJ (US); Eliot Julien Cowan, Atherton, CA (US); Krishna Kumar Rao, Stanford, CA (US); Avery Noam Cowan, Atherton, CA (US)

(73) Assignee: X Development LLC, Mountain View, CA (US)

( * ) Notice: Subject to any disclaimer, the term of this patent is extended or adjusted under 35 U.S.C. 154(b) by 758 days.

(21) Appl. No.: 18/075,521

(22) Filed: Dec. 6, 2022

(65) Prior Publication Data

US 2023/0177407 A1    Jun. 8, 2023

Related U.S. Application Data

(60) Provisional application No. 63/265,042, filed on Dec. 7, 2021.

(51) Int. Cl.
*G06N 20/20* (2019.01)

(52) U.S. Cl.
CPC .................................... *G06N 20/20* (2019.01)

(58) Field of Classification Search
None
See application file for complete search history.

(56) References Cited

U.S. PATENT DOCUMENTS

| | | | |
|---|---|---|---|
| 10,163,061 B2 * | 12/2018 | Grove | ..................... G06N 20/00 |
| 11,128,737 B1 | 9/2021 | Fox et al. | |
| 2019/0171428 A1 | 6/2019 | Patton et al. | |

(Continued)

FOREIGN PATENT DOCUMENTS

WO    WO 2021/167998    8/2021

OTHER PUBLICATIONS

Bright et al., Automate model retraining with Amazon SageMaker Pipelines when drift is detected; Nov. 2, 2021; https://aws.amazon.com/blogs/machine-learning/automate-model-retraining-with-amazon-sagemaker-pipelines-when-drift-is-detected/ ; Total pp. 24 (Year: 2021).*

(Continued)

*Primary Examiner* — Alan Chen
(74) *Attorney, Agent, or Firm* — Fish & Richardson P.C.

(57)    ABSTRACT

Methods, systems, and apparatus for providing a ML model for inference, the ML model having been trained using a first set of training data to provide predictions associated with an adverse event, after training of the ML model, receiving data from one or more data sources, the data representative of characteristics relevant to predictions associated with the adverse event, providing a second set of training data, determining, by a trigger module, a trigger decision based on a set of signals at least partially determined from the second set of training data, the trigger decision indicating whether the ML model is to be one of updated and retrained based on the second set of training data, and selectively executing one of updating and retraining of the ML model using at least a portion of the second set of training data in response to the trigger decision.

21 Claims, 3 Drawing Sheets

(56) References Cited

U.S. PATENT DOCUMENTS

2020/0286002  A1      9/2020   Szanto et al.
2021/0184958  A1      6/2021   Kolar et al.

OTHER PUBLICATIONS

Office Action in Australian Appln. No. 2022283684, dated Aug. 12, 2024, 3 pages.
Office Action in Canadian Appln. No. 3,185,163, dated Jul. 4, 2025, 5 pages.
Office Action in Canadian Appln. No. 3,185,163, dated May 8, 2024, 4 pages.
Office Action in Australian Appln. No. 2022283684, dated Aug. 22, 2023, 6 pages.
Office Action in Australian Appln. No. 2024213145, mailed on Oct. 23, 2025, 4 pages.

* cited by examiner

*300*

302 Receive data

304 Aggregate data

306 Provide training data

308 Process data information

310 Receive signal(s)

312 Determine TD

314 Selectively retrain ML model(s)

316 Provide retrained ML model(s) for inference

TRAINING MACHINE LEARNING MODELS TO PREDICT CHARACTERISTICS OF ADVERSE EVENTS USING INTERMITTENT DATA

CROSS-REFERENCE TO RELATED APPLICATIONS

This application claims the benefit of and priority to U.S. Prov. App. No. 63/265,042 filed on Dec. 7, 2021, which is expressly incorporated herein by reference for all purposes.

TECHNICAL FIELD

This specification relates to training machine learning (ML) models and inferencing using ML models.

BACKGROUND

Adverse events, such as natural disasters are increasing in both frequency and intensity. Example natural disasters can include wildfires, hurricanes, tornados, and floods, among several others. Natural disasters often result in significant loss that can include a spectrum of economic losses, property losses, and physical losses (e.g., deaths, injuries). Consequently, significant time and effort is expended not only predicting likelihood of occurrences of natural disasters, but also characteristics of natural disasters such as duration, severity, spread, and the like. Technologies, such as machine learning (ML), have been leveraged to generate predictions around natural disasters. However, natural disasters present a special use case for predictions using ML models, which results in technical problems that must be addressed to generate reliable and actionable predictions.

SUMMARY

In general, innovative aspects of the subject matter described in this specification relate to training a machine learning (ML) model and inference using the ML model to predict characteristics of adverse events. More particularly, innovative aspects of the subject matter described in this specification relate to a ML model management system to automatically update data relevant to predictions using the ML model for inference and selectively updating/retraining ML models.

In general, innovative aspects of the subject matter described in this specification can include actions of providing a ML model for inference, the ML model having been trained using a first set of training data to provide predictions associated with an adverse event, after training of the ML model, receiving data from one or more data sources, the data representative of characteristics relevant to predictions associated with the adverse event, providing a second set of training data based on the data received from the one or more data sources, determining, by a trigger module, a trigger decision based on a set of signals at least partially determined from the second set of training data, the trigger decision indicating whether the ML model is to be one of updated and retrained based on the second set of training data, and selectively executing one of updating and retraining of the ML model using at least a portion of the second set of training data in response to the trigger decision. Other implementations of this aspect include corresponding systems, apparatus, and computer programs, configured to perform the actions of the methods, encoded on computer storage devices.

These and other implementations can each optionally include one or more of the following features: the set of signals includes one or more of a data statistics signal and a data ratio signal, the data statistics signal representing at least one statistical value determined for the second set of training data, the data ratio signal represents a ratio of updated training data in the second set of training data relative to the first set of training data; the set of signals includes one or more of a decision point signal and a climatological signal, the decision point representative of a decision point in triggering one of updating and retraining of the ML model, the climatological signal representative of onset of a climatological event; the trigger decision is determined by providing an aggregate trigger signal based on two or more trigger signals determine based on the set of signals, and comparing the aggregate signal to a threshold; the trigger decision is determined by inputting the set of signals to a trigger ML model that provides the trigger decision as output; after updating or retraining of the ML model, a metric determined for the ML model exceeds a threshold improvement relative to the metric determined for the ML model prior to updating or retraining of the ML model; and the ML model is an ensemble model and updating includes adding a model to the ensemble model based on the second set of training data.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
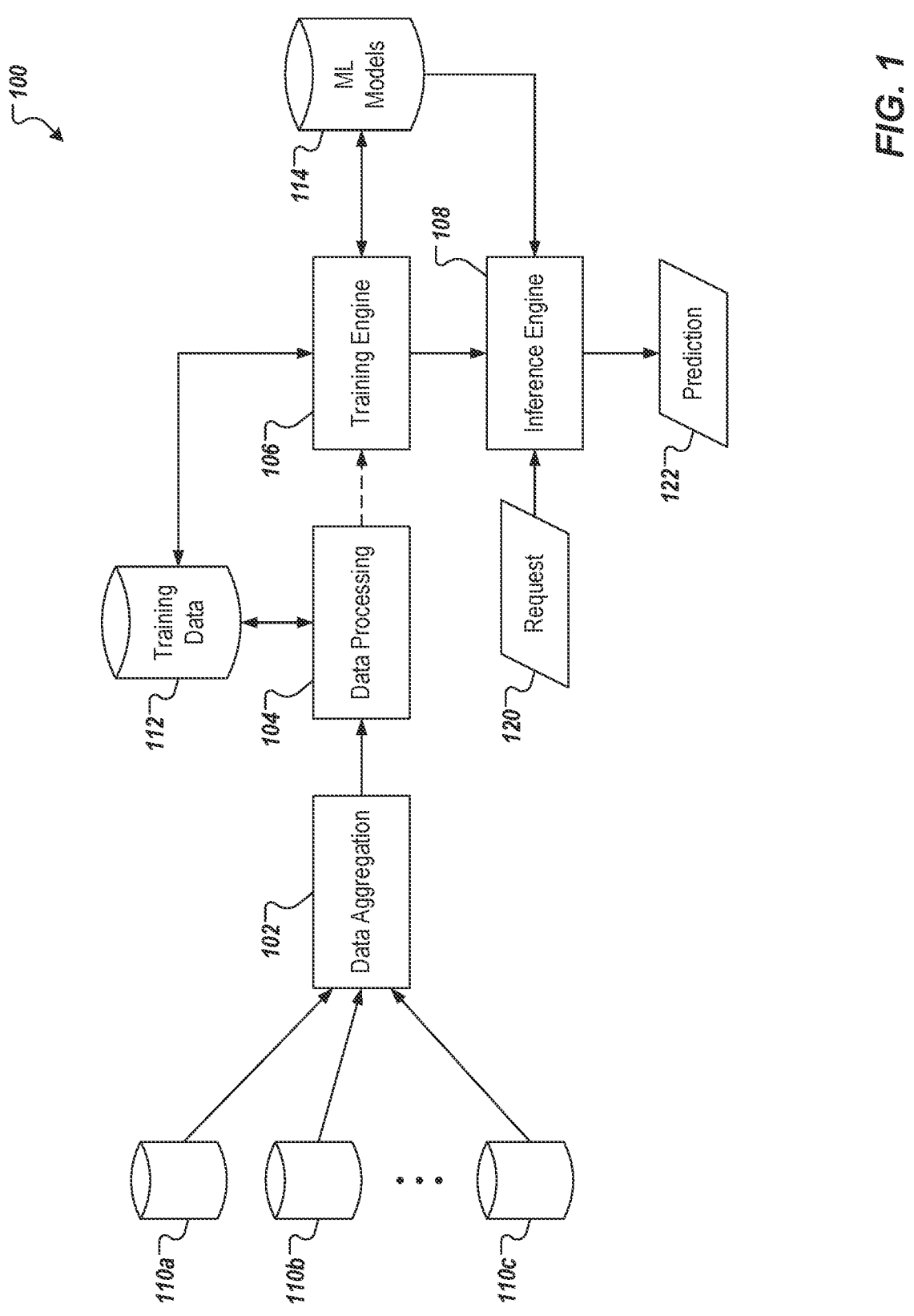
FIG. 1 is a diagram of an example machine learning (ML) system for training one or more ML models and using the one or more ML models for predicting characteristics of adverse events.

This specification describes systems, methods, devices, and other techniques relating training a machine learning (ML) model and inference using the ML model to predict characteristics of adverse events (e.g., a likelihood that an adverse event will occur within a particular geographic region). More particularly, innovative aspects of the subject matter described in this specification relate to a ML model management system to automatically update data relevant to predictions using ML models for inference and selectively update or retrain ML models.

Implementations of the present disclosure are described in further detail herein with reference to an example adverse event, which includes a wildfire. It is contemplated, however, that implementations of the present disclosure are applicable to any appropriate adverse event, such as natural disasters and extreme weather events. For example, implementations of the present disclosure can be used to train ML models and use ML models to predict characteristics of heavy rain events, flooding, hurricanes, and tornadoes, among other adverse events.

To provide context for the subject matter of the present disclosure, and as introduced above, ML has been leveraged to generate predictions around adverse events, such as wildfires. For example, ML models can be used to generate predictions representative of characteristics of a wildfire, such as likelihood of occurrence, and, if predicted to occur, severity, and spread, among other characteristics of the wildfire. As discussed in further detail herein, ML models are trained based on training data that represents historical instances of wildfires, characteristics of such wildfires, as well as properties of locations at which wildfires have occurred. After a ML model has been trained, the ML model is used during inference to provide predictions.

However, occurrences of adverse events, such as wildfires, can be dynamic over time. For example, wildfires can be seasonal with a higher number of occurrences in a hot and dry season as compared to a cool and rainy season. As another example, wildfires can be affected by longer-term weather patterns (e.g., climate change, El Niño, La Niña), such that wildfires in a season (e.g., summer) of one year may have a different number of occurrences and/or different characteristics than wildfires in the same season (e.g., summer) of another year. Consequently, accuracy of a ML model can be time-constrained, such that the predictions of the ML model become less accurate as real-world conditions change. This can be referred to as model drift, which can include, for example, concept drift and data drift. In some examples, concept drift refers to instances in which properties of dependent variables change over time, and data drift refers to instances in which properties of independent variables change over time (e.g., due to seasonal changes).

In some scenarios, model drift is addressed by periodically updating or retraining a ML model and/or providing multiple ML models (e.g., a ML model for each season, a ML model for each season and each year). However, such measures in addressing model drift have technical drawbacks. For example, training a ML model is a processor- and memory-intensive exercise that not only consumes technical resources, but can also be time-consuming. As another example, provisioning multiple ML models implies not only training of each ML model and the resulting time- and resource-consumption, but also memory footprint required to store and use the multiple ML models. Accordingly, repetitive training (e.g., updating, retraining) of ML models, particularly in instances of multiple ML models is inefficient in terms of technical resource expended. For example, traditional approaches to retraining ML models can result in only an incremental reduction in model drift, resulting in incremental improvements at the expense of technical resources. Further, ML models that are trained to perform specific tasks perform better (e.g., more accurately) than ML models that are trained for more general tasks. When a dataset is experiencing concept drift and if the ML model on all of the available data every time it is retrained the ML model is essentially being trained to be more general over time. For example, training will include training examples that may follow a very different response function than the more recent data. This often causes the ML model to be increasingly less accurate as it is retrained over time.

For purposes of illustration, and by non-limiting example, a traditional approach can include updating or retraining a ML model at a specified frequency (e.g., each day, once a week, once a month). That is, the ML model is updated or retrained regardless of any benefit achieved by updating or retraining. As a consequence, a metric (e.g., accuracy) associated with the ML model may only be improved by less than a threshold amount between periods at the expense of technical resources consumed for updating or retraining.

In view of this, and as introduced above, implementations of the present disclosure are directed to a ML model management system to automatically update data relevant to predictions using ML models for inference and selectively updating or retraining ML models. In some implementations, the ML model management system of the present disclosure makes more efficient use of technical resources by, for example, selectively retraining ML models at times that will provide a non-incremental improvement of the ML model. In some examples, a non-incremental improvement can be described as a metric (e.g., accuracy) associated with the ML model being improved by at least a threshold amount as a result of updating or retraining of the ML model.

To provide further context for implementations of the present disclosure, one or more ML models can be trained to predict characteristics of an adverse event, such as natural disasters, using training data that is representative of characteristics of occurrences of the natural disaster, for example. Example types of ML models can include Gradient Boosted Decision Trees (GBDTs), Convolutional Neural Networks (CNNs), Residual Neural Networks (RNNs), Generative Adversarial Networks (GANs). The training data can include region data representative of respective regions (e.g., geographical areas), at which the natural disaster has occurred. In some examples, each ML model predicts a respective characteristic of the natural disaster. Example ML models can include, without limitation, a risk model that predicts a likelihood of occurrence of the natural disaster in a region, a spread model that predicts a rate of spread of the natural disaster in the region (e.g., if the natural disaster is predicted to occur), a spread model that predicts a spread of the natural disaster in the region (e.g., if the natural disaster is predicted to occur), and an intensity model that predicts an intensity of the natural disaster (e.g., if the natural disaster is predicted to occur). Characteristics of a natural disaster can be temporal. For example, a risk of wildfire is higher during a dry season than during a rainy season. Consequently, each ML model can be temporal. That is, for example, each ML model can be trained using training data representative of regions at a particular period of time.

In some examples, the region data can include an image of the region and a set of properties of the region. More generally, the region data can be described as a set of data layers (e.g., N data layers), each data layer providing a respective type of data representative of a property of the region. In some examples, the data layers can number in the tens of data layers to hundreds of data layers. In some examples, each data layer includes an array of pixels, each pixel representing a portion of the region and having data associated therewith that is representative of the portion of the region. A pixel can represent an area (e.g., square meters

5

(m²), square kilometers (km²)) within the region. The area that a pixel represents in one data layer can be different from the area that a pixel represents in another data layer. For example, each pixel within a first data layer can represent X km² and each pixel within a second data layer can represent Y km², where X≠Y.

An example, data layer can include an image layer, in which each pixel is associated with image data, such as red, green, blue (RGB) values (e.g., each ranging from 0 to 255). Another example layer can include a vegetation layer, in which, for each pixel, a normalized vegetation difference index (NVDI) value (e.g., in range of [−1, 1], lower values indicating absence of vegetation). Other example layers can include, without limitation, a temperature layer, in which a temperature value is assigned to each pixel, a humidity layer, in which a humidity value is assigned to each pixel, a wind layer, in which wind-related values (e.g., speed, direction) are assigned to each pixel, a barometric pressure layer, in which a barometric pressure value is assigned to each pixel, a precipitation layer, in which a precipitation value is assigned to each pixel, and an elevation layer, in which an elevation value is assigned to each pixel.

In general, data values for pixels of data layers can be obtained from various data sources including data sources provided by, for example, governmental entities, non-governmental entities, public institutions, and private enterprises. For example, data can be obtained from databases maintained by the National Weather Service (NWS), the United States Fire Service (USFS), and the California Department of Forestry and Fire Protection (CAL FIRE) among many other entities. For example, weather-related data for a region can be obtained from a web-accessible database (e.g., through a hypertext transfer protocol (HTTP), calls to an application programming interface (API)). In another example, data stored in a relational database can be retrieved through queries to the database (e.g., structured query language (SQL) queries).

In general, data values for pixels of data layers can be obtained from various data sources including data sources provided by, for example, governmental entities, non-governmental entities, public institutions, and private enterprises. For example, data can be obtained from databases maintained by the National Weather Service (NWS), the United States Fire Service (USFS), and the California Department of Forestry and Fire Protection (CAL FIRE) among many other entities. For example, weather-related data for a region can be obtained from a web-accessible database (e.g., through a hypertext transfer protocol (HTTP), calls to an application programming interface (API)). In another example, data stored in a relational database can be retrieved through queries to the database (e.g., structured query language (SQL) queries).

Because values across the data layers can change over time, the region data can be temporal. For example, temperature values for the region can be significantly different in summer as compared to winter.

Accordingly, the region data can include an array of pixels (e.g., $[p_{1,1}, \ldots, p_{i,j}]$), in which each pixel is associated with a vector of N dimensions, N being the number of data layers. For example, $p_{i,j}=[I_{i,j}, V_{i,j}, W_{i,j}, \ldots]$, where I is image data, V is vegetation data, and W is weather data.

As training data, the region data, which can be referred to as region training data in the context of training, can include one or more characteristic layers that provides known characteristic data for respective characteristics of a natural disaster. The known characteristic data represents actual values of the respective characteristics as a result of the natural disaster. For example, a wildfire can occur within a region and, as a result, characteristics of intensity, spread, duration, and the like can be determined for the wildfire. Accordingly, as training data, the region data can include, for example, $p_{i,j}=$ $$[I_{i,j}, V_{i,j}, W_{i,j}, \ldots, C_{A,i,j}^{K}, C_{B,i,j}^{K}, \ldots],$$

where $$C_{A,i,j}^{K}$$

and $$C_{A,i,j}^{K}$$

are respective known (K) characteristics (i.e., historical characteristics) of a natural disaster in question.

One or more ML models are trained using the region training data. The training process can depend on a type of the ML model. In general, the ML model is iteratively trained, where, during an iteration, also referred to as epoch, one or more parameters of the ML model are adjusted, and an output (e.g., predicted characteristic value) is generated based on the training data. For each iteration, a loss value is determined based on a loss function (e.g., mean squared error (MSE), log(likelihood)). The loss value represents a degree of accuracy of the output of the ML model as compared to a known value (e.g., known characteristic). The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration (epoch) of training. In some examples, the iterative training continues for a pre-defined number of iterations (epochs). In some examples, the iterative training continues until the loss value meets the expected value or is within a threshold range of the expected value.

To generate predictions, region data representative of a region, for which predictions are to be generated, is provided as input to a (trained) ML model, which generates a predicted characteristic for each pixel within the region data. An example output of the ML model can include $$p_{i,j} = [C_{i,j}^{P}],$$

where C is a characteristic predicted (P) by the ML model. Example characteristics can include, without limitation, likelihood of occurrence (e.g., risk), a rate of spread, an intensity, and a duration. In some examples, an image of the region can be displayed to visually depict the predicted characteristic across the region. For example, different values of the characteristic can be associated with respective visual cues (e.g., colors, shades of colors), and the predicted characteristic can be visually displayed as a heatmap over an image of the region.

FIG. 1 is a diagram of an example machine learning (ML) system 100 for training one or more ML models and using the one or more ML models for predicting characteristics of adverse events. In the example of FIG. 1, the example ML system 100 includes a data aggregation module 102, a data processing module 104, a training engine 106, and an inference engine 108. The example ML system 100 further includes data sources 110*a*, 110*b*, 110*c*, a training data store 112, and a ML model store 114. As described in further detail herein, the ML system 100 can receive a request 120 for inference and provide a prediction 122 in response to the request 120.

In some implementations, the data aggregation module 102 ingests and aggregates data from the data sources 110*a*, 110*b*, 110*c*. In some examples, the data includes historical data that is representative of geographic regions. In some examples, the data includes historical data that is representative of occurrences of wildfires in geographic regions. The data can be provided in multiple, disparate formats. Example formats can include, without limitation, images, shapefiles, vector data, and rasters. For example, an image can be described as a visual representation of a geographic region in any appropriate color space (e.g., RGB, hue, saturation, value (HSV), hue, saturation, lightness (HSL)). In some examples, a shapefile can be described as storing geometric location and attribute information of features of a geographic region, in which features be represented by points, lines, and/or polygons (areas). In some examples, vector data can represent speed and direction of properties of a geographic area (e.g., windspeed and direction). In some examples, a raster can be described as an array of pixels, each pixel storing data representative of properties of a geographic area (e.g., temperature, rainfall, NVDI). An image file can be described as a type of raster. In some examples, for each geographic region of interest, the data aggregation module 102 aggregates historical data from the data sources 110*a*, 110*b*, 110*c*.

In accordance with implementations of the present disclosure, data within each of the data sources 110*a*, 110*b*, 110*c* can be updated at different cadences (e.g., frequencies). For example, data from one data source 110*a*, 110*b*, 110*c* can be updated daily, data from another data source 110*a*, 110*b*, 110*c* can be updated weekly, data from still another data source 110*a*, 110*b*, 110*c* can be updated less frequently. By way of non-limiting example, overhead images (e.g., satellite, aerial) of a geographic region can be updated less frequently than weather-related data (e.g., temperature, pressure, precipitation).

In some implementations, data that is aggregated for a geographic region is provided to the data processing module 104, which can process the data to provide training data for the geographic region, the training data being stored in the training data store 112. In some examples, the data processing module 104 processes the data to put the data into the same format (e.g., image, raster).

In some implementations, the training engine 106 selectively trains a ML model in response to availability of training data including updated training data. For example, the data processing module 104 can send a signal to the training engine 106 that updated training data is available in the training data store 112 for a geographic region. In some examples, training can include training a new ML model, updating a ML model, and/or retraining a previously trained ML model. Example training of a ML model is described in further detail in commonly assigned U.S. Prov. App. No. 63/310,808, filed on Feb. 16, 2022, the disclosure of which is expressly incorporated herein by reference in the entirety for all purposes. In some examples, updating a ML model can include adding a portion to a ML model (e.g., adding a model to a model ensemble). For purposes of illustration, non-limiting, example reference can be made to a GBDT, in which updating can include adding one or more additional decision trees to an ensemble of decision trees, the added decision tree(s) being generated based on the updated training data. In some examples, retraining a ML model can include training the ML model using updated training data and at least a portion of the training data that the ML model had been previously trained on. After updating or retraining, the ML model is stored in the ML model store 114.

In accordance with implementations of the present disclosure, the training engine 106 can process a set of signals to determine whether to train a ML model. In some implementations, the set of signals can include a data statistics signal, a data ratio signal, one or more decision point signals, and one or more climatological signals. In some implementations, if at least one signal exceeds a respective threshold value, training of the ML model is triggered. In some implementations, if each signal in a sub-set of signals exceeds respective threshold values, training of the ML model is triggered. In some implementations, if each signal in the set of signals exceeds respective threshold values, training of the ML model is triggered. In some examples, the set of signals is input to a trigger ML model that provides an output indicating whether training of the ML model is to be triggered.

Figure 2:
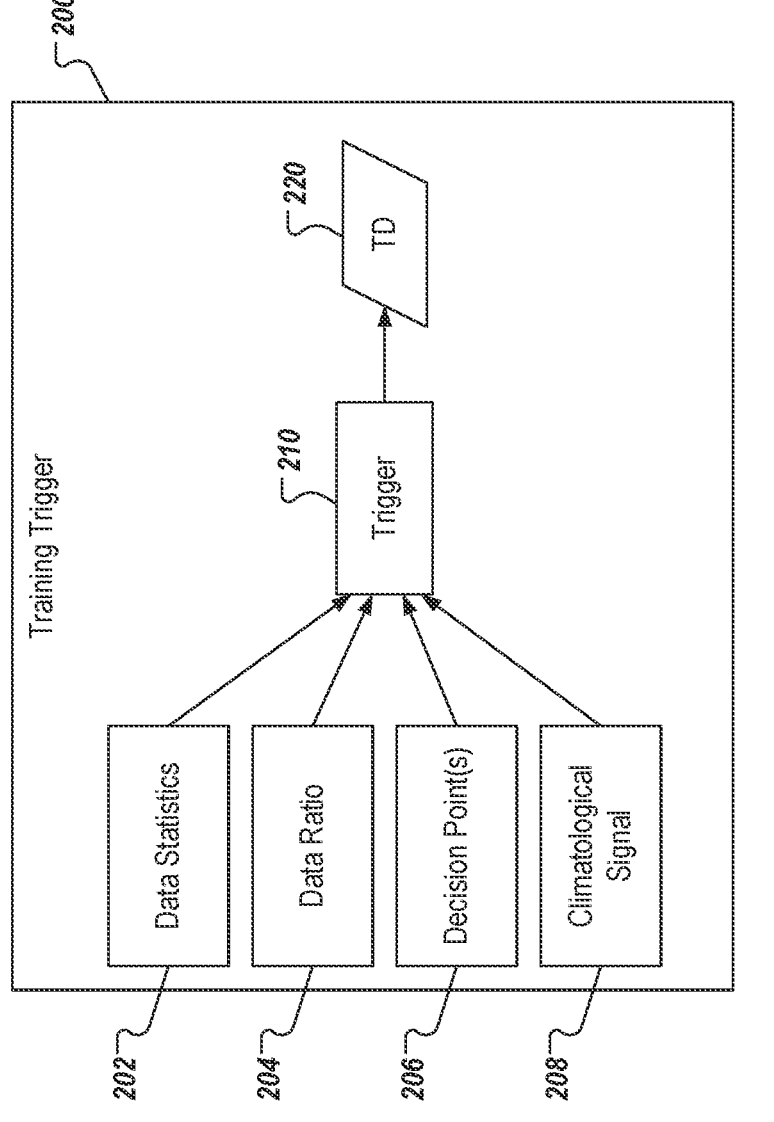
FIG. 2 is a diagram of a training trigger system for selectively updating or retraining ML models in accordance with implementations of the present disclosure.

FIG. 2 is a diagram of a training trigger system 200 for selectively re-training ML models in accordance with implementations of the present disclosure. In the example of FIG. 2, the training trigger system 200 includes a data statistics module 202, a data ratio module 204, a decision point module 206, a climatological signal module 208, and a trigger module 210. As described in further detail herein, the training trigger system 200 can determine a trigger decision (TD) 220 that indicates whether one or more ML models are to be trained (e.g., updated, retrained). In some examples, if a ML model is to be trained, the TD 220 can indicate whether the ML model is to be updated or retrained. In some examples, the training trigger system 200 is included within the training engine 106 of FIG. 1. In some examples, the training trigger system 200 is external to the training engine 106 and transmits the TD 220 to the training engine 106.

In some examples, the data statistics module 202 compares one or more statistical measures of the updated training data to respective one or more statistical measures of training data used to train the ML model, which is referred to herein as previous training data. For example, the data statistics module 202 can determine a difference between a statistic of the updated training data to the statistic of the previous training data. An example statistic can include, without limitation, a distribution, in which a distribution of the updated training data can be compared to a distribution of the previous training data. For example, a z-score can be determined for the updated training data and a z-score can be determined for the previous training data, and a difference between the z-scores can be provided as a data statistics signal. In some examples, by accounting for data statistics, updating or retraining of the ML model can be executed to provide non-incremental improvements. For example, presence of unexpected and/or outlier data can be indicated in the data statistics, which will result in non-incremental improvements to the ML model by training the ML model using the updated training data.

In some examples, the data ratio module 204 determines a ratio of updated training data to previous training data. In some examples, the ratio indicates an amount of updated training data that has been received relative to an amount of previous training data. In some examples, by accounting for the ratio, updating or retraining of the ML model can be delayed until a sufficient amount of updated training data is available to provide non-incremental improvements.

In some examples, the decision points module 206 can determine one or more decision point signals based on one or more factors. Example decision points can include, without limitation, a seasonal decision point and a time decision point. In some examples, a seasonal decision point indicates timing of an impending season, for which the ML model is to be updated or retrained. For example, a wildfire season for a geographic location can historically start in a particular month. Consequently, a decision point signal can be generated ahead of the particular month and can indicate that the ML model is to be updated or retrained in anticipation of the impending season. As another example, insurance actuary activity for a wildfire season can be scheduled at a particular time of year. Consequently, a decision point signal can be generated ahead of the particular time of year and can indicate that the ML model is to be updated or retrained. In some examples, by accounting for any decision point(s), updating or retraining of the ML model can be delayed until the ML model is needed. In some examples, the decision point signals are determined based on schedule data received by the decision points module 206. In some examples, the schedule data can be received from one or more schedule data sources and can indicate dates for respective decision points.

In some examples, the climatological signal module 208 can determine one or more climatological signals based on one or more climatological events. Example climatological events can include, without limitation, onset of a long-term weather pattern, and onset of a wildfire season. For example, while a climatological event can be expected to start at a particular time of year, the actual onset of the climatological event can vary from year-to-year. In view of this, a climatological signal that indicates the onset of a climatological event enables updating or retraining of the ML model at any appropriate time relative to the onset of the climatological event (e.g., not too early, not too late). In some examples, the climatological signals are determined based on climate data received by the climatological signal module 208. In some examples, the climate data can be received from one or more climate data sources.

In accordance with implementations of the present disclosure, the trigger module 210 receives signals from one or more of the data statistics module 202, the data ratio module 204, the decision point module 206, and the climatological signal module 208, and processes the signal(s) to provide the TD 220.

In some implementations, each signal can be compared to a respective threshold to determine a respective trigger value. For example, a z-score difference can be compared to a threshold difference to determine a trigger value (e.g., 0, if the z-score difference is less than the threshold difference, 1 if the z-score meets or exceeds the threshold difference). As another example, a ratio of updated training data to previous training data can be compared to a threshold ratio to determine a trigger value (e.g., 0, if the ratio is less than the threshold ratio, 1 if the ratio meets or exceeds the threshold ratio). In some examples, a decision point signal can be used as a trigger value (e.g., 0, if a respective decision point has not been reached, 1, if the respective decision point has been reached). In some examples, a climatological signal can be used as a trigger value (e.g., 0, if a respective climatological event has not begun, 1, if the respective climatological event has begun).

In some examples, trigger values for each of the signals can be aggregated to determine an aggregate trigger value. For example, an average trigger value can be determined as the aggregate trigger value. As another example, a weighted average trigger value can be determined as the aggregate trigger value. For example, each trigger value can be weighted to represent a relative importance of the respective signal in triggering training. As one non-limiting example, a decision point can be weighted more heavily than other signals. As another non-limiting example, the data statistics signal can be weighted more heavily than the data ratio signal. In some examples, the aggregate trigger value can be compared to a threshold trigger value to determine the TD 220. For example, if the aggregate trigger value meets or exceeds the threshold trigger value, the TD 220 is set to indicate that updating or training of the ML model is to be executed. If the aggregate trigger value does not meet or exceed the threshold trigger value, the TD 220 is set to indicate that updating or training of the ML model is not to be executed.

In some implementations, the signals received by the trigger module 210 are input to a trigger ML model that provides the TD 220 as an output. In some examples, the trigger ML model is trained to predict an optimal time to trigger updating or retraining of the ML model based on the signals. For example, the trigger ML model can be trained on training data the includes historical signals corresponding to historical updating/retraining of the ML model, and improvements to the ML model achieved as a result of the historical updating or retraining. In some implementations, updating or retraining of the ML model is executed automatically in response to the TD 220 indicating that updating or retraining is to be executed.

In some implementations, the trigger module 210 can execute a relatively small, lightweight ML model to provide a relevant summary prediction for the data. For example, and without limitation, a relatively small ML model can be executed to predict an expected amount of burned area for a year and provide this as a single number that can function as a trigger for a larger ML model that predicts the risk score for every location in the country. In some examples, this smaller ML model can be used to compare data between time periods (e.g., the current year's data to previous year's data) to determine whether the data of the time periods is sufficiently different from historical data. This small ML model can additionally help to determine which years of previous data should be included to train a ML model for the next year. For example, keeping only the historical years that are most similar to this most recent year when training a ML model for the future rather than using all of historical data.

Figure 3:
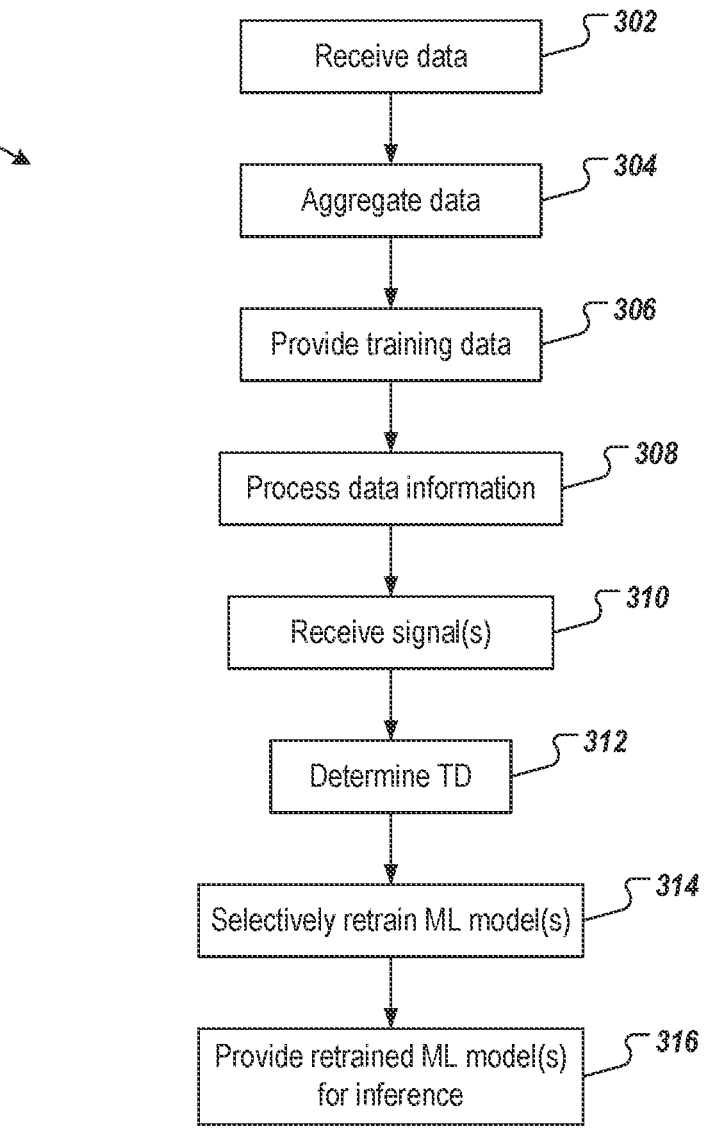
FIG. 3 is a flow diagram of an example process that can be executed in accordance with implementations of the present disclosure.

FIG. 3 is a flow diagram of an example process 300 that can be executed in accordance with implementations of the present disclosure. Operations of the process 300 can be implemented as instructions stored on one or more computer readable media which may be non-transitory, and execution of the instructions by one or more data processing apparatus can cause the one or more data processing apparatus to perform the operations of the process 300. The example process 300 can be executed to selectively trigger training of a ML model in an effort to provide non-incremental improvements to the ML model.

Data is received (302) and the data is aggregated (304). For example, and as described herein with reference to FIG. 1, the data aggregation module 102 ingests and aggregates data from the data sources 110a, 110b, 110c. In some examples, for each geographic region of interest, the data aggregation module 102 aggregates historical data from the data sources 110a, 110b, 110c. Training data is provided (306). For example, and as described herein, data that is aggregated for a geographic region is provided to the data processing module 104, which can process the data to provide training data for the geographic region, the training data being stored in the training data store 112. In some examples, the data processing module 104 processes the data to put the data into the same format (e.g., image, raster).

Data information is processed (308). For example, and as described herein with reference to FIG. 2, the data statistics module 202 determines one or more statistics signals and the data ratio module 204 determines a data ratio signal. In some examples, the data statistics module 202 compares one or more statistical measures of the updated training data to respective one or more statistical measures of previous training data. For example, the data statistics module 202 can determine a data statistics signal as a difference between a statistic (e.g., z-score) of the updated training data to the statistic (e.g., z-score) of the previous training data. In some examples, the data ratio module 204 determines a data ratio signal as ratio of updated training data to previous training data. In some examples, the ratio indicates an amount of updated training data that has been received relative to an amount of previous training data.

One or more signals are received (310). For example, and as described herein, the trigger module 210 receives signals from one or more of the data statistics module 202, the data ratio module 204, the decision point module 206, and the climatological signal module 208, and processes the signal(s) to provide the TD 220. A TD is determined (312). For example, and as described herein, the signals can be processed to determine an aggregate trigger value, which value can be compared to a threshold trigger value to determine the TD 220. For example, if the aggregate trigger value meets or exceeds the threshold trigger value, the TD 220 is set to indicate that updating or training of the ML model is to be executed. If the aggregate trigger value does not meet or exceed the threshold trigger value, the TD 220 is set to indicate that updating or training of the ML model is not to be executed. As another example, and as also described herein, the signals can be input to a trigger ML model that provides the TD 220 as an output. In some examples, the trigger ML model is trained to predict an optimal time to trigger updating or retraining of the ML model based on the signals. For example, the trigger ML model can be trained on training data the includes historical signals corresponding to historical updating/retraining of the ML model, and improvements to the ML model achieved as a result of the historical updating or retraining.

One or more ML models are selectively updated or retrained (314). For example, and as described herein, if the TD 220 is set to indicate that updating or training of a ML model is to be executed, updating or training of the ML model is to be executed, and, if the TD 220 is set to indicate that updating or training of the ML model is not to be executed, updating or training of the ML model is delayed. In accordance with implementations of the present disclosure, after updating or retraining of the ML model, a metric determined for the ML model exceeds a threshold improvement relative to the metric determined for the ML model prior to updating or retraining of the ML model. For example, an accuracy of the updated or retrained ML model is greater than an accuracy of the ML model (prior to updating or training) by a threshold amount. The ML model is provided for inference (316). For example, and as described herein, if the ML model us updated or retrained, the updated or retrained ML model is stored in the ML model store 114 and is available to the inference engine 108 for inference.

Particular implementations of the subject matter described in this specification can be executed so as to realize one or more of the following advantages. For example, implementations of the present disclosure enable more efficient use of computing resources by executing updating or retraining of ML models to achieve non-incremental improvement to metrics (e.g., accuracies) of the ML models as a result of the updating or retraining. For purposes of illustration, and by non-limiting example, a traditional approach can include updating or retraining a ML model at a specified frequency, which can result in only incremental improvement (e.g., an improvement that is less than a threshold amount) between periods. As a consequence, technical resources are consumed for little benefit. In contrast, by selectively triggering updating or retraining of the ML model, technical resources are expended to achieve non-incremental improvement to the ML model. Further, by responding to drift and filtering the available training dataset to a smaller subset, implementations of the present disclosure not only time and computing resources, the ML model is constrained to a more homogenous task (e.g., less general) and therefore can achieve better accuracy.

Implementations of the subject matter and the functional operations described in this specification can be realized in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs (i.e., one or more modules of computer program instructions) encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. The program instructions can be encoded on an artificially-generated propagated signal (e.g., a machine-generated electrical, optical, or electromagnetic signal) that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry (e.g., an FPGA (field programmable gate array) or an ASIC (application-specific integrated circuit)). The apparatus can optionally include, in addition to hardware, code that creates an execution environment for computer programs (e.g., code) that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in some cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry (e.g., a FPGA, an ASIC), or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver), or a portable storage device (e.g., a universal serial bus (USB) flash drive) to name just a few.

Computer-readable media suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks.

To provide for interaction with a user, implementations of the subject matter described in this specification can be provisioned on a computer having a display device (e.g., a CRT (cathode ray tube) or LCD (liquid crystal display) monitor) for displaying information to the user and a keyboard and a pointing device (e.g., a mouse, a trackball), by which the user can provide input to the computer. Other kinds of devices can be used to provide for interaction with a user as well; for example, feedback provided to the user can be any form of sensory feedback (e.g., visual feedback, auditory feedback, tactile feedback); and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device (e.g., a smartphone that is running a messaging application), and receiving responsive messages from the user in return.

Data processing apparatus for implementing ML models can also include, for example, special-purpose hardware accelerator units for processing common and compute-intensive parts of machine learning training or production (i.e., inference, workloads).

ML models can be implemented and deployed using a machine learning framework (e.g., a TensorFlow framework, a Microsoft Cognitive Toolkit framework, an Apache Singa framework, an Apache MXNet framework).

Implementations of the subject matter described in this specification can be realized in a computing system that includes a back-end component (e.g., as a data server) a middleware component (e.g., an application server), and/or a front-end component (e.g., a client computer having a graphical user interface, a web browser, or an app through which a user can interact with implementations of the subject matter described in this specification, or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a user device (e.g., for purposes of displaying data to and receiving user input from a user interacting with the device), which acts as a client. Data generated at the user device (e.g., a result of the user interaction) can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method executed by one or more processors, and comprising:
    providing a machine learning (ML) model for inference, the ML model having been trained using a first set of training data to provide predictions associated with an adverse climatological event in a geographic region;
    after training of the ML model, receiving data from one or more data sources, the data representative of characteristics relevant to predictions associated with the adverse climatological event in the geographic region;
    providing a second set of training data based on the data received from the one or more data sources;
    determining, by a trigger module, a trigger decision based on a set of signals at least partially determined from the second set of training data, the trigger decision indicating whether the ML model is to be one of updated or retrained using at least a portion of the second set of training data, wherein the set of signals comprises a climatological signal representative of onset of an adverse climatological event in the geographic region; and
    selectively executing one of updating or retraining of the ML model using at least a portion of the second set of training data in response to the trigger decision.

2. The method of claim 1, wherein the set of signals comprises one or more of a data statistics signal and a data ratio signal, the data statistics signal representing at least one statistical value determined for the second set of training data, the data ratio signal represents a ratio of updated training data in the second set of training data relative to the first set of training data.

3. The method of claim 1, wherein the set of signals further comprises a decision point signal, the decision point signal representative of a decision point in triggering one of updating or retraining of the ML model.

4. The method of claim 1, wherein the trigger decision is determined by:
    providing an aggregate trigger signal based on two or more trigger signals determine based on the set of signals; and
    comparing the aggregate signal to a threshold.

5. The method of claim 1, wherein the trigger decision is determined by inputting the set of signals to a trigger ML model that provides the trigger decision as output.

6. The method of claim 1, wherein, after updating or retraining of the ML model, a metric determined for the ML model exceeds a threshold improvement relative to the metric determined for the ML model prior to updating or retraining of the ML model.

7. The method of claim 1, wherein the ML model is an ensemble model and updating comprises adding a model to the ensemble model based on the second set of training data.

8. A non-transitory computer-readable storage medium coupled to one or more processors and having instructions stored thereon which, when executed by the one or more processors, cause the one or more processors to perform operations comprising:
    providing a machine learning (ML) model for inference, the ML model having been trained using a first set of training data to provide predictions associated with an adverse climatological event in a geographic region;
    after training of the ML model, receiving data from one or more data sources, the data representative of characteristics relevant to predictions associated with the adverse climatological event in the geographic region;
    providing a second set of training data based on the data received from the one or more data sources;
    determining, by a trigger module, a trigger decision based on a set of signals at least partially determined from the second set of training data, the trigger decision indicating whether the ML model is to be one of updated or retrained using at least a portion of the second set of training data, wherein the set of signals comprises a climatological signal representative of onset of an adverse climatological event in the geographic region; and
    selectively executing one of updating or retraining of the ML model using at least a portion of the second set of training data in response to the trigger decision.

9. The non-transitory computer-readable storage medium of claim 8, wherein the set of signals comprises one or more of a data statistics signal and a data ratio signal, the data statistics signal representing at least one statistical value determined for the second set of training data, the data ratio signal represents a ratio of updated training data in the second set of training data relative to the first set of training data.

10. The non-transitory computer-readable storage medium of claim 8, wherein the set of signals further comprises a decision point signal, the decision point signal representative of a decision point in triggering one of updating or retraining of the ML model.

11. The non-transitory computer-readable storage medium of claim 8, wherein the trigger decision is determined by:
    providing an aggregate trigger signal based on two or more trigger signals determine based on the set of signals; and
    comparing the aggregate signal to a threshold.

12. The non-transitory computer-readable storage medium of claim 8, wherein the trigger decision is determined by inputting the set of signals to a trigger ML model that provides the trigger decision as output.

13. The non-transitory computer-readable storage medium of claim 8, wherein, after updating or retraining of the ML model, a metric determined for the ML model exceeds a threshold improvement relative to the metric determined for the ML model prior to updating or retraining of the ML model.

14. The non-transitory computer-readable storage medium of claim 8, wherein the ML model is an ensemble model and updating comprises adding a model to the ensemble model based on the second set of training data.

15. A system, comprising:

a computing device; and a computer-readable storage device coupled to the computing device and having instructions stored thereon which, when executed by the computing device, cause the computing device to perform operations comprising:

providing a machine learning (ML) model for inference, the ML model having been trained using a first set of training data to provide predictions associated with an adverse climatological event in a geographic region;

after training of the ML model, receiving data from one or more data sources, the data representative of characteristics relevant to predictions associated with the adverse climatological event in the geographic region;

providing a second set of training data based on the data received from the one or more data sources;

determining, by a trigger module, a trigger decision based on a set of signals at least partially determined from the second set of training data, the trigger decision indicating whether the ML model is to be one of updated or retrained using at least a portion of the second set of training data, wherein the set of signals comprises a climatological signal representative of onset of an adverse climatological event in the geographic region; and selectively executing one of updating or retraining of the ML model using at least a portion of the second set of training data in response to the trigger decision.

16. The system of claim 15, wherein the set of signals comprises one or more of a data statistics signal and a data ratio signal, the data statistics signal representing at least one statistical value determined for the second set of training data, the data ratio signal represents a ratio of updated training data in the second set of training data relative to the first set of training data.

17. The system of claim 15, wherein the set of signals further comprises a decision point signal, the decision point signal representative of a decision point in triggering one of updating or retraining of the ML model.

18. The system of claim 15, wherein the trigger decision is determined by:

providing an aggregate trigger signal based on two or more trigger signals determine based on the set of signals; and comparing the aggregate signal to a threshold.

19. The system of claim 15, wherein the trigger decision is determined by inputting the set of signals to a trigger ML model that provides the trigger decision as output.

20. The system of claim 15, wherein, after updating or retraining of the ML model, a metric determined for the ML model exceeds a threshold improvement relative to the metric determined for the ML model prior to updating or retraining of the ML model.

21. The system of claim 15, wherein the ML model is an ensemble model and updating comprises adding a model to the ensemble model based on the second set of training data.

* * * * *